United States Patent [19]

Theuwissen

[11] Patent Number: 4,991,016
[45] Date of Patent: Feb. 5, 1991

[54] CONTROL METHOD FOR A FRAME TRANSFER SENSOR IN AN IMAGE PICK-UP DEVICE TO OBTAIN BLACK LEVEL INFORMATION IN A PICTURE SIGNAL, AND IMAGE PICK-UP DEVICE SUITABLE FOR USE OF SAID METHOD

[75] Inventor: Albert J. P. Theuwissen, Eindhoven, Netherlands

[73] Assignee: U.S. Philips Corp., New York, N.Y.

[21] Appl. No.: 274,089

[22] Filed: Nov. 18, 1988

[30] Foreign Application Priority Data

Nov. 27, 1987 [NL] Netherlands .................. 8702846

[51] Int. Cl.⁵ .................................... H04N 3/14
[52] U.S. Cl. .................. 358/213.31; 358/213.26
[58] Field of Search .............. 358/213.22, 213.26, 358/213.28, 213.31, 213.16; 357/241 R

[56] References Cited

U.S. PATENT DOCUMENTS

| | | | |
|---|---|---|---|
| 4,574,313 | 3/1986 | Battson | 358/213.26 |
| 4,575,763 | 3/1986 | Elabd | 358/213.26 |
| 4,580,169 | 4/1986 | Savoye | 358/213.26 |
| 4,723,168 | 2/1988 | Theuwissen | 358/213.26 |
| 4,811,105 | 3/1989 | Kinoshita et al. | 358/213.26 |

Primary Examiner—Stephen Brinich
Attorney, Agent, or Firm—Emmanuel J. Lobato; Marianne R. Rich

[57] ABSTRACT

The control method is associated with a frame information transfer in accordance with the so-called accordion principle in which information shifts are locally effected with an opening, a transporting and a closing phase. The opening phase involves an enlargement of sensor element areas in a column direction in which a shift is effected during the transporting phase. The closing phase involves a reduction in the column direction of the enlarged areas (IE, BE, SE) at the appointed locations. In the presence of a sensor black level section (BLS) shielded from radiation and arranged between an image section (IS) and a storage section (SS) of the frame transfer sensor (FTS), clock pulse signals are applied to the black level section (BLS) after a frame information transfer period and during a black level generation period, which clock pulses lead to a transporting phase and a closing phase in accordance with the accordion principle, a black level reference is obtained which leads to a correct black level information in a picture signal to be supplied by a sensor output (OT).

4 Claims, 4 Drawing Sheets

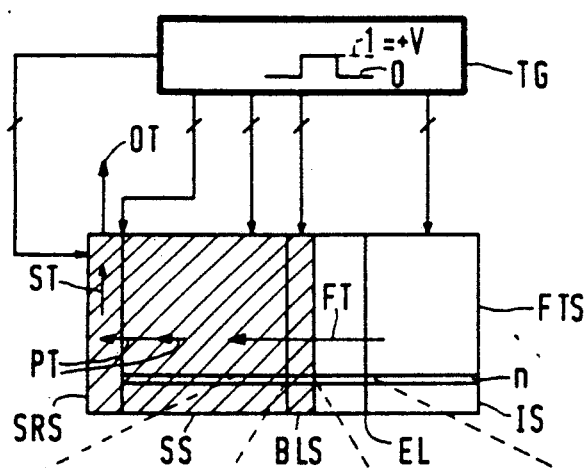
FIG.1a
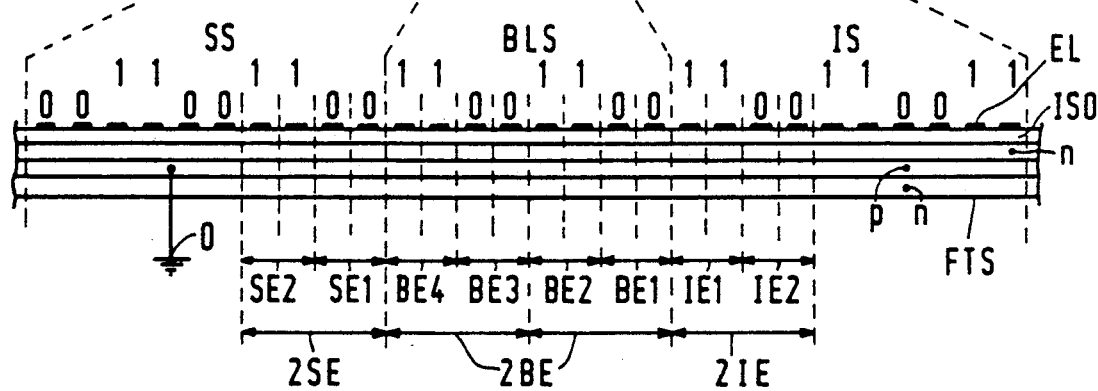
FIG.1b
FIG.1

CONTROL METHOD FOR A FRAME TRANSFER SENSOR IN AN IMAGE PICK-UP DEVICE TO OBTAIN BLACK LEVEL INFORMATION IN A PICTURE SIGNAL, AND IMAGE PICK-UP DEVICE SUITABLE FOR USE OF SAID METHOD

BACKGROUND OF THE INVENTION

The invention relates to a control method for a frame transfer sensor in an image pick-up device to obtain black level information in a picture signal, the sensor including an image section comprising sensor image elements arranged in rows and columns for converting incident radiation into charge packet information as picture information, a sensor black level section coupled thereto, and a storage section coupled thereto for the purpose of picture information storage comprising sensor storage elements arranged in rows and columns and a parallel-in, series-out shift register section coupled thereto comprising at least one row of sensor shift register elements, said black level, storage and register sections being shielded from radiation, the device for performing the control method including a time signal generator for applying at least clock pulse signals to control electrodes of the sensor so that after a picture information integration period a frame information transfer via the columns is effected from the image section to the storage section, whereafter row after row and periodically a parallel information shift in the storage section and a parallel information transfer from the storage section to the shift register section is effected, between which parallel information transfers the shift register section each time has a serial information shift to an output of the sensor for supplying the picture signal comprising picture information and black level information associated with the sensor elements.

The invention also relates to an image pick-up device suitable for use of the method.

Such a method and image pick-up device are known from U.S. Pat. No. 4,635,126. This Patent describes the frame transfer after the picture information integration period from the black level section and the image section to the shift register section and the storage section. Subsequently, the black level information followed by the information which has been picked up becomes available at the sensor output. The Patent states that the black level information is subsequently utilized for combining a control of the picture information integration period and of a signal amplification factor.

It appears that the known control method starts from the fact that after the last, picked-up picture information has passed through the black level section an initial black level reference is present in this section. During the next picture information integration period black level information is subsequently accumulated in the black level section as from the initial black level reference. The local black level accumulation must be effected in sensor elements each covering an element area, i.e. reference area which is as large as that at the pick-up elements.

The known control method implicitly starts upon a correctly laid down initial black level reference in the correct reference area. This starting point need not be applicable to all known control methods.

SUMMARY OF THE INVENTION

It is an object of the invention to realize a control method for obtaining the black level reference in the reference area in a frame transfer sensor which operates in accordance with the so-called accordion principle at the frame information transfer. To this end the control method according to the invention is characterized in that the time signal generator applies said clock pulse signals to control electrodes of the sensor for obtaining a frame information transfer in accordance with the accordion principle, so that during the frame information transfer period information shifts are locally effected with an opening, a transporting and a closing phase, the opening phase involving an enlargement of the sensor element areas in the column direction, the transporting phase involving a shift in the column direction of the enlarged sensor element areas and the closing phase involving a reduction in the column direction of the enlarged sensor element areas at the appointed locations, said time signal generator, for obtaining the black level reference, applying further clock pulse signals to control electrodes of the sensor black level section comprising sensor elements arranged in rows and columns, said further clock pulse signals occurring after the frame information transfer period and giving a transporting phase and a closing phase in accordance with the accordion principle during a black level generation period in the said sensor section, with a black level reference shift going in the direction from the image section to the storage section.

The use of the said further clock pulses in the control method in accordance with the accordion principle leads to the correct black level reference in the correct reference area.

An embodiment of the control method associated with interlaced picture display is also characterized in that in the case of generating an interlaced picture signal, in which the image element rows with an integrating part being shifted in a cycle of at least two fields are present during the picture information integration period and in which in one of the fields of the cycle the picture information integrating part of one of the image element rows of the image section is contiguous to a sensor element row of the sensor black level section, the time signal generator applies a clock pulse signal to the said image element row during at least a part of the black level generation period, preventing the contiguity of the said picture information integrating part.

An image pick-up device suitable for use of the control method according to the invention, comprising a frame transfer sensor including an image section having sensor image elements arranged in rows and columns for converting incident radiation into charge packet information as picture information and a sensor black level section coupled thereto and a storage section coupled thereto for picture information storage having sensor storage elements arranged in rows and columns and a parallel-in, series-out shift register section coupled thereto having at least one row of sensor shift register elements, which black level, storage and register sections are shielded from radiation, which device for performing the control method includes a time signal generator for applying at least clock pulse signals to control electrodes of the sensor is characterized in that the sensor black level section having sensor elements arranged in rows and columns is formed with control electrodes being coupled to the time signal generator separately from other sensor control electrodes.

An embodiment of an image pick-up device according to the invention comprising the sensor black level section with the minimum number of control electrodes is characterized in that the sensor black level section comprises at least three control electrodes.

BRIEF DESCRIPTION OF THE DRAWINGS

The invention will now be described in greater detail, by way of example, with reference to the accompanying drawings in which FIG. 1 is a block-schematic diagram in FIG. 1a of an image pick-up device according to the invention and a cross-section in FIG. 1b of a part of a frame transfer sensor present therein, FIG. 3 is a time diagram similar to that shown in FIG. 2, but associated with a faulty generation of an interlaced picture signal, and FIG. 4 is a time diagram similar to that shown in FIG. 2, associated with a correct generation of an interlaced picture signal.

DETAILED DESCRIPTION OF THE INVENTION

Figure 2:
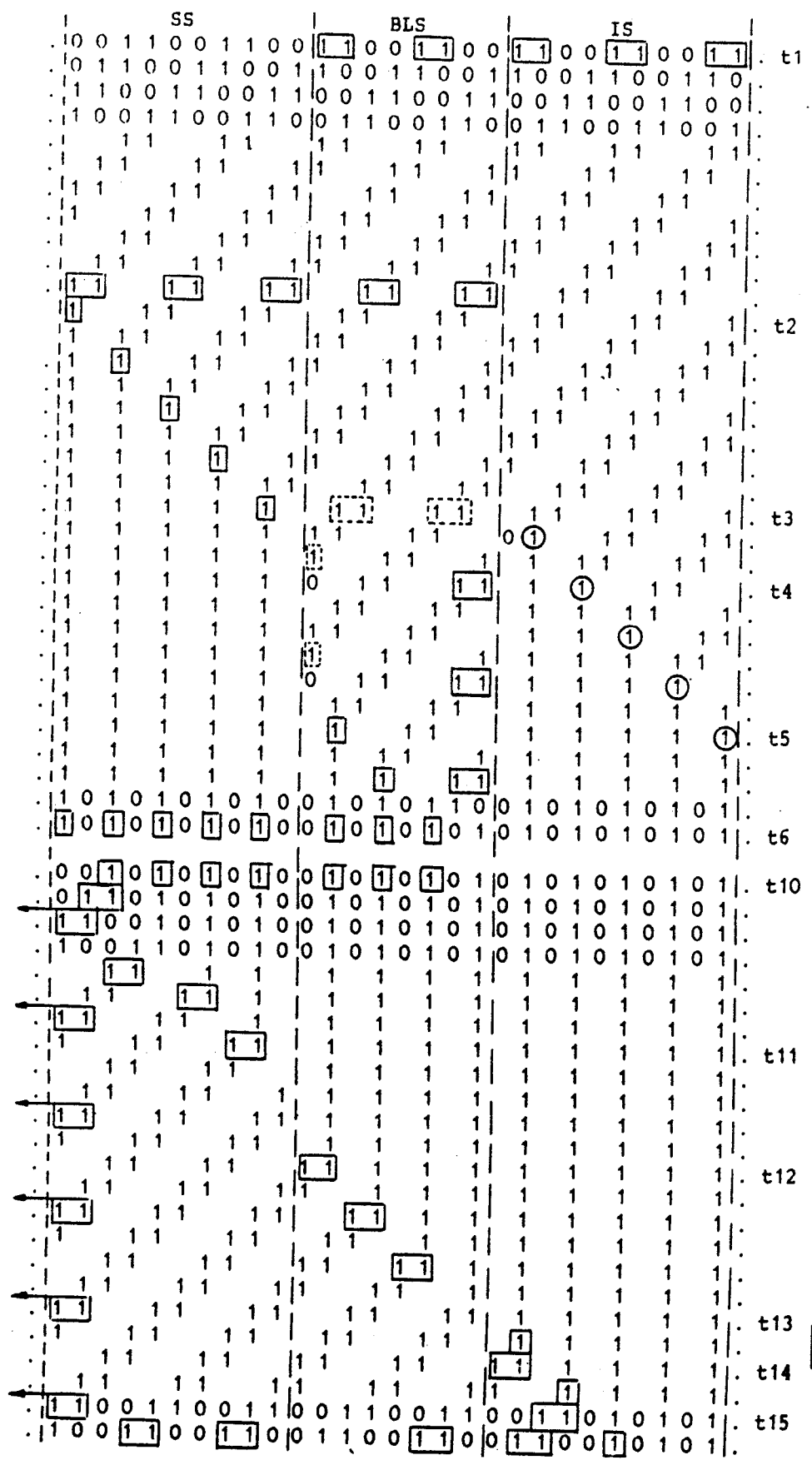
FIG. 2 shows a time diagram in the form of a pattern of 0s and 1s of clock pulse signals to be applied to control electrodes of the sensor of FIG. 1 to explain the control method according to the invention.

FIG. 1 shows a frame transfer sensor denoted by FTS in FIG. 1a, which sensor comprises the following sensor sections: an image section IS, a black level section BLS, a storage section SS and a shift register section SRS. The latter three sections are shielded from incident radiation such as light, which shielding is indicated by a shaded area. The image section IS and the storage section SS are constructed in known manner (not shown in FIG. 1a) with sensor image elements and sensor storage elements arranged in rows and columns. The direction of the element rows may be the same as that of a control electrode EL which is shown as an example at the image section IS. The control electrode EL forms part of a system of parallel control electrodes. The direction of the columns of the elements is transverse to the electrode direction, and the reference n at the image section IS denotes a channel of n-type semiconductor material present in the sensor FTS in the column direction. The n-channel forms part of a system of parallel n-channels.

In FIG. 1b the control electrode EL is shown in the cross-section as an example for the system of parallel control electrodes. In addition to the cross-section the reference n denotes the n-channel of FIG. 1a. An insulating layer ISO on which the electrode system (EL) is provided separates this system from the n-channel system. In the cross-section of FIG. 1b the references p and n denote layers of p-type and n-type semiconductor materials, respectively, the described n-channel system being present in the p-type layer under which an n-type layer is present as a substrate. In FIG. 1b the p-type layer has a connection to ground, the ground potential being denoted by 0. The described structure of the sensor FTS is given by way of example and embodiments with a different or reverse type of semiconductor material are possible.

Figure 3:
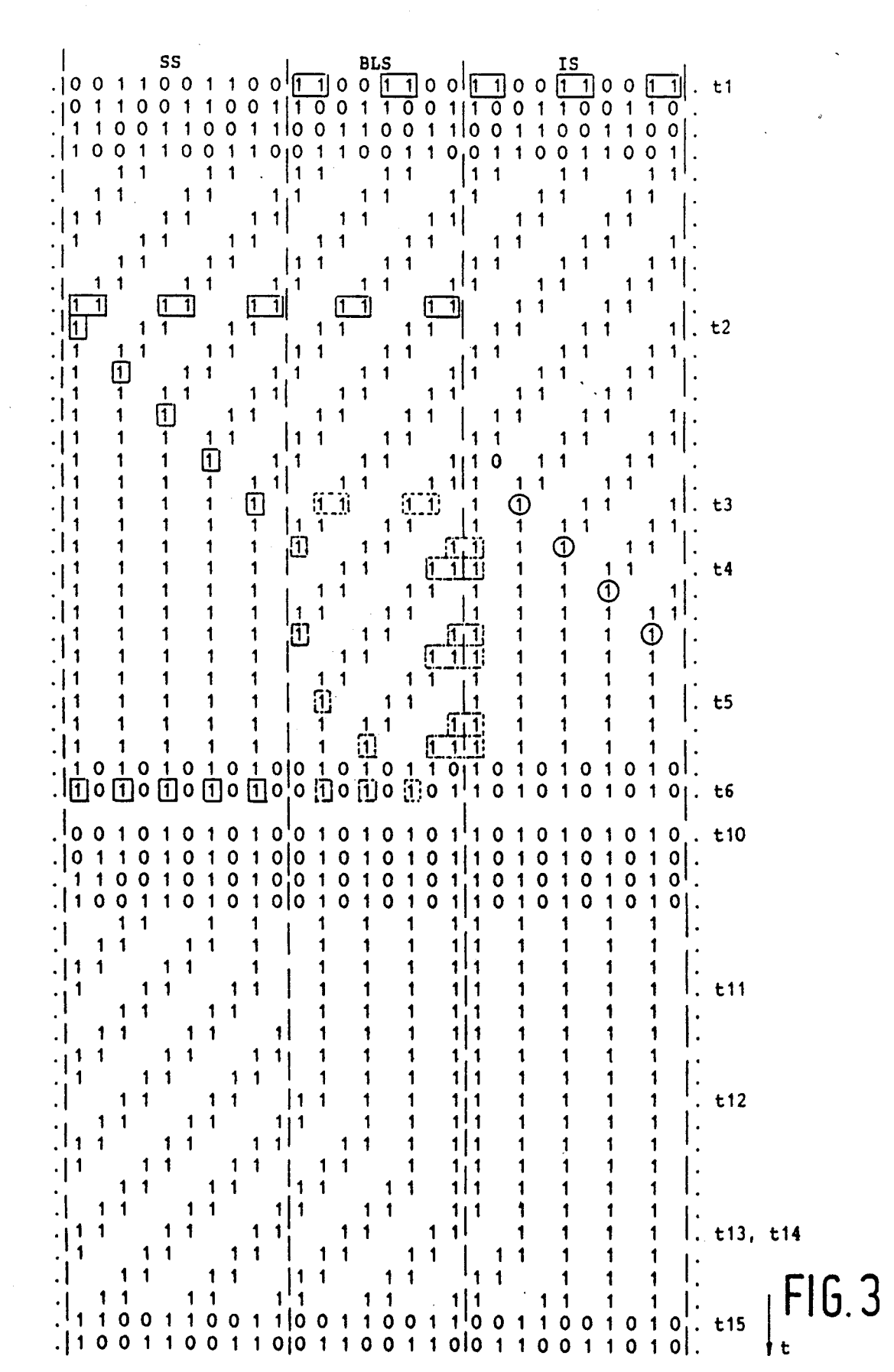
Figure 4:
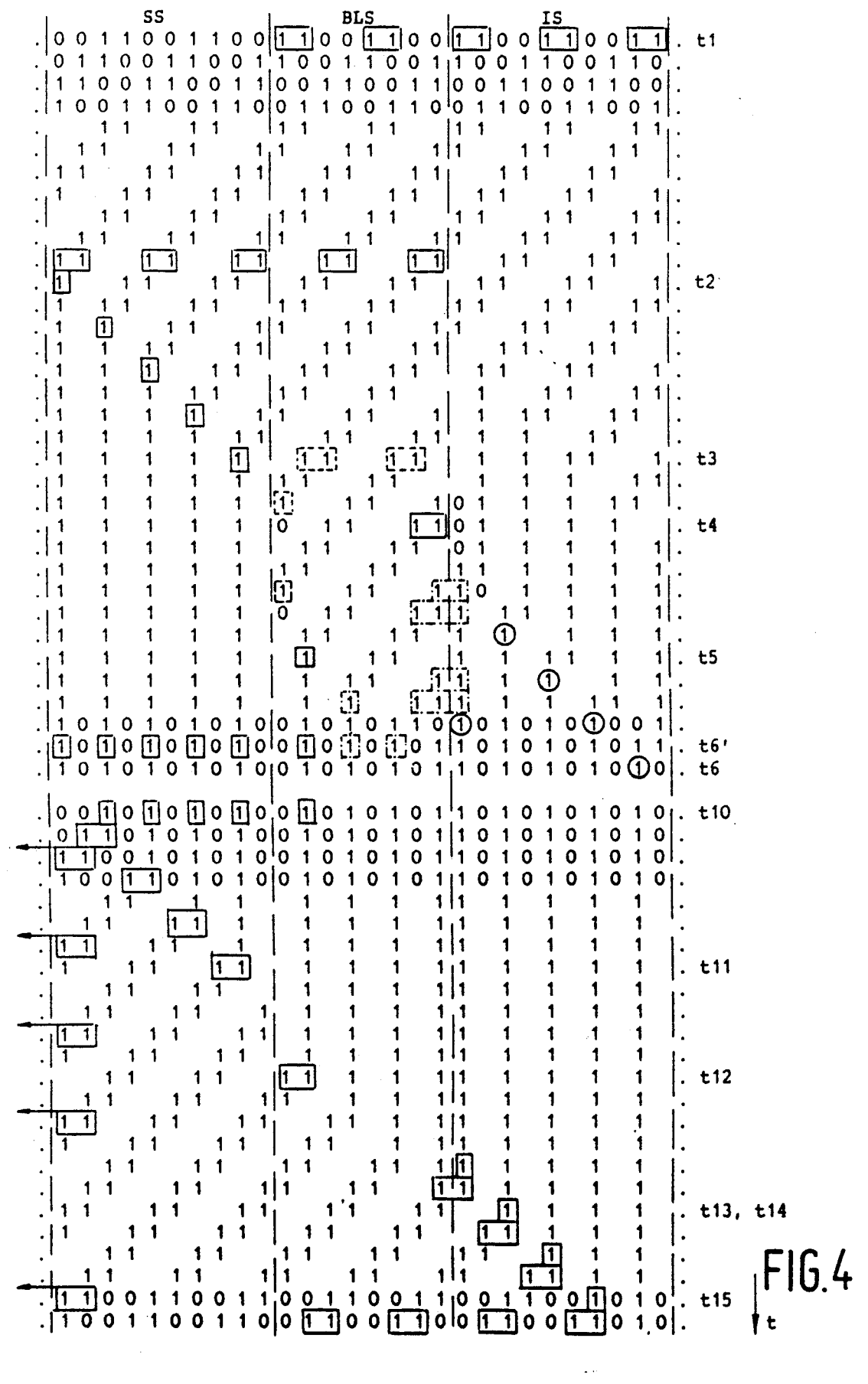

In the electrode system (EL) a pattern of 0s and 1s is shown by way of example, and the description of FIGS. 2, 3 and 4 is based on this pattern. This pattern represents clock pulse signals, with the 0 corresponding to the ground potential and the 1 corresponding to a more positive voltage (+V). FIG. 1 shows a time signal generator TG applying the clock pulse signals to, inter alia the control electrode system (EL). Under the control of the clock pulse signals the sensor sections IS, SS and also BLS operate with respective sensor elements IE, SE and BE. Two control electrodes EL are present in the column direction for each sensor element. Two sensor image elements are denoted by IE1 and IE2 as an example in the cross-section shown in FIG. 1b, which indication also applies to the width of the relevant image element row and the relevant image element area with the associated part of the n-channel. The same applies to the indication at the sensor elements BE and SE (SE1 and SE2). The sensor section BLS is shown with eight electrodes EL as an example in FIG. 1b, with four associated element rows and element areas in the column direction BE1, BE2, BE3 and BE4. It will be proved that a minimum number of three electrodes may suffice. The choice of eight electrodes shown emanates from a practical embodiment of the sensor FTS.

For performing the known frame transfer at the sensor FTS (without the black level section BLS being present) the time signal generator TG applies the clock pulse signals to the sensor via single or multiphase leads connected to the sections IS, SS and SRS. While using a four-phase control there occurs a frame transfer after the picture information integration period from the section IS to the section SS, which frame information transfer is illustrated by means of an arrow FT in FIG. 1a. The picture information integration is effected under that part of the image element rows IE at which the voltage value $1 = +V$ occurs on the associated control electrode EL. The ground potential 0 occurs as a cut-off voltage on the other electrode EL of the element row IE. In fact, the electrons of electron hole pairs obtained by, for example, light radiation in the image section IS, which electrons lead to charge packet information, will collect in the n-channel parts under the control electrodes EL with $1 = +V$, while the holes are conducted to the ground terminal 0 of the p-type layer. In the case of single interlaced picture signal generation (FIGS. 3 and 4 as compared with FIG. 2) in, for example, a cycle of two fields, the integrating part is present in a shifted form under the control electrodes EL with the combinations 0 1 and 1 0. In, for example, two-fold interlacing with three fields, three control electrodes EL per image element row IE are present with, for example, the combinations 0 1 0, 0 0 1 and 1 0 0.

After the frame information transfer FT a parallel information shift in the storage section SS is periodically effected row after row and a parallel information transfer is effected from the storage section SS to the shift register section SRS, which is illustrated in FIG. 1a by means of a double-headed arrow PT. Between the transfers PT the shift register section SRS each time performs a serial information shift illustrated by an arrow ST. The result is that a picture signal occurs at an output OT of the sensor FTS, which signal, upon display on the display screen of a display device, supplies an image of a scene to be recorded, from which scene the light radiation originates.

The present invention relates to the control of the black level section BLS, particularly in the implementation of the frame transfer FT in accordance with the accordion principle, to obtain a black level reference. For a detailed description of the accordion principle reference is made to an Article in "Philips Technical Review" Vol. 43, No. ½, 1986, pp. 1-8, entitled "The accordion imager, a new solid-state image sensor". In accordance with the accordion principle information shifts with an opening, a transporting and a closing phase are locally effected during the frame information transfer. The opening phase involves an enlargement of the sensor element areas in the column direction. The transporting phase involves a shift in the column direction of the enlarged sensor element areas. The closing phase involves a reduction in the column direction of the enlarged sensor element areas at the appointed locations. A combination 0 1 and 1 0 per two electrodes during the picture information integration period will become the combination 1 1 0 0 per four electrodes during the frame transfer period.

To explain the control method according to the invention, FIGS. 2, 3 and 4 show time diagrams as a function of time t in the form of a pattern of 1s and 0s of clock pulse signals to be applied to the control electrodes EL (FIG. 1b) of the sensor FTS. In FIGS. 2, 3 and 4 it is assumed that the pattern is present at an instant t1 which is shown in FIG. 1b at the electrodes EL of the sensor FTS. Ten electrodes EL of the image section IS and the storage section SS and the eight electrodes EL of the black level section BLS of the sensor FTS are considered for the purpose of explanation. The pattern given is associated with the transporting phase of the accordion principle with a four-phase control. For elucidation of the information transfer five areas of picture information are denoted by means of rectangles at the instant t1. In FIGS. 2, 3 and 4 some rows of 1s and 0s are fully shown and to elucidate the variation of the pattern the 0s have been omitted. To emphasize the importance of a local 0, this 0 is indicated.

FIGS. 2, 3 and 4 show that five rectangular information blocks 1 1 are transferred from the instant t1 to the storage section SS and the section BLS and are present therein just before an instant t2. At the instant t2 the closing phase of the accordion starts at the left in the pattern at the storage section SS, which is illustrated by means of the square information block 1. The closing phase at the storage section SS continues until an instant t3 at which the closing ends with the picture information at the appointed location in the storage section SS. At the instant t3 two information blocks shown in broken lines are present in the section BLS, which blocks, as is assumed, do not contain picture information but only smear information. The smear information emanates from the shift in the image section IS of "empty" information blocks.

According to FIG. 2 the closing phase of the accordion starts at the image section IS just after the instant t3. An encircled 1 illustrates at the left in the image section IS that the image element row (IE1 in FIG. 1b) is ready at the appointed location for the picture information integration with the combination 0 1. Subsequently, just before an instant t4, the smear information block initially shown in a rectangular form is compressed to an information block shown in a square form, whereafter at the instant t4 the smear information is pushed away to the p-layer and the n-substrate of the sensor FTS of FIG. 1b due to the supply of the 0 shown and is thus removed. At the instant t4 in FIG. 2 a rectangular information block is shown at the right in the section BLS, which block has been produced in the shielded section BLS itself. Subsequently, this information block is transferred in the shielded section BLS and the closing phase of the accordion starts at an instant t5 in the section BLS. The obtained information block shown as a square contains black level reference information which is generated in the shielded black level section BLS.

Between the instants t4 and t5 the smear information present in the second information block shown in broken lines is removed, similarly as has been described with reference to the first block and a second black level reference information block is generated and transferred. At the instant t5 the closing phase of the accordion ends at the shown part of the image section IS.

From the instant t5 to an instant t6 the closing phase of the accordion is present at the black level section BLS and a third black level reference information block is generated. At the instant t6 three black level reference information blocks shown as squares are present in the black level section BLS at the appointed locations. The black level reference is generated in the manner described during a black level generation period between the instants t4 and t6, the transporting phase (t4 to t5) and the closing phase (t5 to t6) in accordance with the accordion principle being present with a black level reference shift in the direction from the image section IS to the storage section SS. In order to realize the black level reference shift separately, it is required that the control electrodes at the black level section BLS can be controlled separately from the other sensor control electrodes.

It is assumed that at an instant t10 in FIG. 2 the left-hand picture information block 1 shown as a square in the storage section SS has been shifted. Just after the instant t10 the picture information block 1 shown as a square and lying next to it is enlarged to a picture information block 1 1 which is subsequently shifted to the part, not shown, of the storage section SS. This shift is illustrated by means of a rectangle provided with an arrow. At an instant t11 the information block 1 shown as a square and adjoining the section BLS is enlarged to the information block 1 1 shown as a rectangle. The instant t11 is the final instant of the opening phase of the accordion at the storage section SS. At an instant t12 the opening phase of the accordion at the black level section BLS has started, which changes over to the transporting phase at an instant t13. At an instant t14 the opening phase of the accordion at the image section IS has started. At an instant t15 the first black level reference information block has arrived at the left in the shown part of the storage section SS and this block will subsequently be further transferred, as is illustrated by the arrow.

FIG. 2 shows that a black level reference in the picture signal ultimately obtained at the sensor output OT of FIG. 1a occurs three times, namely during the generation of three picture signal lines corresponding to three sensor element rows. This result emanates from the choice of forming the sensor black level section BLS with eight control electrodes EL, i.e. with four sensor element rows BE. This choice is based on a practical construction of a frame transfer sensor FTS intended for the control in accordance with the accordion principle with four-phase clock pulse signals. If the sensor black level section BLS is formed with four control electrodes EL the black level reference is generated once (after the instant t5) with the combination 0 1 0 1 at the instant t6 of FIG. 2. The combination 0 1 0 is associated with a construction using the minimum number of three control electrodes EL.

FIG. 2 is associated with the picture signal generation with the combination 0 1 being given at the instant t6 for the picture information integration at the image section IS. In the case of generating a single interlaced picture signal, the combination 1 0 in the second field of the cycle of two fields must be present at the image section IS, as is shown at the instant t6 in FIGS. 3 and 4. FIG. 3 is associated with the picture signal and black level reference generation which is effected in a comparable manner as described with reference to FIG. 2. A comparison of the pattern of 0s and 1s at the instant t4 of FIG. 2 and FIG. 3 shows that black level reference generation according to FIG. 3 starts from below two electrodes at the black level section BLS and one electrode of the image section IS. The information block 1 1 1 is denoted by dot-and-dash lines. The result is that no pure black level reference is generated but that picture information is present as crosstalk therein, which is inadmissible. A solution would be to generate the black level reference only once per cycle of two fields. If it is desirable or required to do this for each field, FIG. 4 shows an adapted pattern of 0s and 1s. Instead of the combination 1 0 at the image element row (IE1 of FIG. 1b) adjoining the section BLS of the section IS of FIG. 3 occurring between the instants t2 and t3, it occurs in FIG. 4 between the instants t4 and t5. The result is that at the instant t4 (and just before and after it) the combination 0 1 is present so that a pure black level reference generation and shift begin at the instant t4. At an instant t6' the end of the closing phase of the accordion occurs at the black level section BLS, whereafter the shown part of the image section IS is ready for the picutre information integration at the instant t6.

FIG. 4 shows that a pure black level reference is obtained once by preventing the combination 1 0 from adjoining the image element row (IE1 of FIG. 1b) between the instants t4 and t6' during a first part of the black level generation period. If the contiguity is prevented during the entire black level generation period between the instants t4 and t6, three pure black level references result.

For the sake of completeness it is to be noted that in the pattern shown in FIG. 4 the instant t13 at the end of the opening phase of the accordion at the black level section BLS coincides with the instant t14 at the start of the opening phase of the accordion at the image section IS.

The control method performed during the black level generation period between the instants t4 and t6 and t6', respectively, leads to the generation of one single black level reference which is identical for both fields and which is free from smear. The black level reference becomes available in the picture signal during one picture line at the start of the fields, in which signal the picture information follows subsequently. FIG. 1b also shows that there is no difference in the structure of the element rows IE and BE and it is apparent that the black level reference generation in the two fields starts at the same element row BE1. All this leads to an optimum black level reference generation.

In the case of two-fold (or multifold) interlacing the measure described with reference to FIG. 4 must be used in the field of the cycle with the combination 1 0 0 at the picture information integration.

I claim:

1. A control method for controlling a frame transfer sensor in an image pick-up device to obtain black level information in a picture signal, the sensor including an image section comprising sensor image elements arranged in rows and columns for converting incident radiation into charge packets corresponding to picture information, a sensor black level section coupled to the image section, a storage section coupled to the black level section for storing picture information, the storage section comprising sensor storage elements arranged in rows and columns, and a parallel-in, series-out shift register section coupled to the storage section and comprising at least one row of sensor shift register elements, said black level, storage and register sections being shielded from radiation, and the device for performing the control method including a time signal generator for applying clock pulse signals to control electrodes of the sensor so that after a picture information integration period a frame information transfer via the columns is effected from the image section to the storage section, and thereafter row after row and periodically a parallel information shift in the storage section and a parallel information transfer from the storage section to the shift register section is effected, between which parallel information transfers the shift register section each time performs a serial information shift to an output of the sensor for supplying the picture signal comprising picture information and black level information associated with the sensor elements, and the control method characterized in that:

the time signal generator applies said clock pulse signals to control electrodes of the sensor for obtaining a frame information transfer in accordance with the accordion principle, so that during the frame information transfer period information shifts are locally effected with an opening, a transporting and a closing phase, the opening phase including an enlargement of the sensor element areas in the column direction, the transporting phase including a shift in the column direction of the enlarged sensor element areas and the closing phase including a reduction in the column direction of the enlarged sensor element areas at the appointed locations, said time signal generator applying additional clock pulse signals to control electrodes of the sensor black level section comprising sensor elements arranged in rows and columns in order to obtain a black level reference, said additional clock pulse signals occurring after the frame information transfer period and effecting a transporting phase and a closing phase in accordance with the accordion principle during a black level generation period in the said sensor section, with a shift in the black level reference occurring in the direction from the image section to the storage section.

2. A control method as claimed in claim 1, characterized in that in the case of generating an interlaced picture signal, in which the image element rows with an integrating part are shifted in a cycle of at least two fields are present during the picture information integration period and in which in one of the fields of the cycle the picture information integrating part of one of the image element rows of the image section is contiguous to a sensor element row of the sensor black level section, the time signal generator applies a clock pulse signal to said image element row during at least a part of the black level generation period, preventing contiguity of the said picture information integrating part.

3. An image pick-up device suitable for use of the control method as claimed in claim 1, comprising a frame transfer sensor including an image section having sensor image elements arranged in rows and columns for converting incident radiation into charge packet information as picture information and a sensor black level section coupled thereto and a storage section coupled thereto for picture information storage having sensor storage elements arranged in rows and columns and a parallel-in, series-out shift register section coupled thereto having at least one row of sensor shift register elements, which black level, storage and register sections are shielded from radiation, which device for performing the control method includes a time signal generator for applying at least clock pulse signals to control electrodes of the sensor, characterized in that the sensor black level section having sensor elements arranged in rows and columns is formed with control electrodes being coupled to the time signal generator separately from other sensor control electrodes.

4. An image pick-up device as claimed in claim 3, characterized in that the sensor black level section comprises at least three control electrodes.

* * * * *